US006791989B1

(12) United States Patent
Steinmetz et al.

(10) Patent No.: US 6,791,989 B1
(45) Date of Patent: Sep. 14, 2004

(54) FIBRE CHANNEL INTERFACE CONTROLLER THAT PERFORMS NON-BLOCKING OUTPUT AND INPUT OF FIBRE CHANNEL DATA FRAMES AND ACKNOWLEDGEMENT FRAMES TO AND FROM A FIBRE CHANNEL

(75) Inventors: Joseph Harold Steinmetz, Rocklin, CA (US); Matthew Paul Wakeley, Roseville, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/474,945

(22) Filed: Dec. 30, 1999

(51) Int. Cl.[7] .......................... H04L 12/28; H04L 12/56
(52) U.S. Cl. ........................ 370/412; 370/428; 370/394
(58) Field of Search ................................ 370/236, 229, 370/394, 412, 428, 429, 413–416; 714/48, 746, 749

(56) References Cited

U.S. PATENT DOCUMENTS

| | | | | |
|---|---|---|---|---|
| 5,588,009 A | * | 12/1996 | Will | 714/749 |
| 5,619,497 A | * | 4/1997 | Gallagher et al. | 370/394 |
| 5,777,987 A | * | 7/1998 | Adams et al. | 370/336 |
| 5,825,748 A | * | 10/1998 | Barkey et al. | 370/236 |
| 5,907,717 A | * | 5/1999 | Ellis | 710/56 |
| 5,933,435 A | * | 8/1999 | Shah et al. | 714/749 |
| 5,968,128 A | * | 10/1999 | Lauck et al. | 709/232 |
| 6,002,675 A | * | 12/1999 | Ben-Michael et al. | 370/315 |
| 6,055,662 A | * | 4/2000 | Lokman | 714/749 |
| 6,366,968 B1 | * | 4/2002 | Hunsaker | 710/52 |
| 6,460,080 B1 | * | 10/2002 | Shah et al. | 709/224 |

* cited by examiner

Primary Examiner—Ajit Patel

(57) ABSTRACT

A method and system for non-blocking processing of data frames and link-control frames within an interface controller component of a fiber channel node. Separate FIFO queues are provided for queuing incoming FC data frames and ACK frames and a separate FIFO queue and list are provided for queuing outgoing FC data frames and buffering outgoing ACK frames. An outbound sequence manager component of the interface controller directly processes incoming ACK frames, transforming them into end-to-end credits that allow the outbound sequence manager to transmit additional FC data frames to the remote node that sent the processed ACK frame. Thus, processing of ACK frames, unlike in prior art interface controller implementations, is neither delayed nor blocked by previously received, but as yet unprocessed, FC data frames.

21 Claims, 14 Drawing Sheets

FIBRE CHANNEL INTERFACE CONTROLLER THAT PERFORMS NON-BLOCKING OUTPUT AND INPUT OF FIBRE CHANNEL DATA FRAMES AND ACKNOWLEDGEMENT FRAMES TO AND FROM A FIBRE CHANNEL

TECHNICAL FIELD

The present invention relates to transmission and reception of fibre channel frames by a fibre channel node, and, in particular, to a method and fibre channel interface controller implementation for non-blocking, concurrent transmission of data frames and reception of data frames and acknowledgement frames.

BACKGROUND OF THE INVENTION

The fibre channel ("FC") is an architecture and protocol for a data communications network for interconnecting computers and peripheral devices. The FC supports a variety of upper-level protocols, including the small computer systems interface ("SCSI") protocol. A computer or peripheral device is linked to the network through an FC port and an FC link comprising copper wires or optical fibres, the computer or peripheral device, FC port, and FC link together referred to as an "FC node." An FC port includes a transceiver and an interface controller, and the computer or peripheral device in which the FC port is contained is called a "host." Hosts generally contain one or more processors, referred to as the "host processor" in the current application. The FC port exchanges data with the host via a local data bus, such as a peripheral computer interface ("PCI") bus. The interface controller conducts lower-level protocol exchanges between the fibre channel and the computer or peripheral device in which the FC port resides.

An interface controller within an FC port serves essentially as a transducer between the serial receiver and transmitter components of the FC port and the host processor of the FC node in which the FC port is contained. The interface controller is concerned with, on the input side, assembling serially-encoded data received from the receiver component into ordered sets of bytes, assembling a majority of the ordered sets of bytes into basic units of data exchange, called "FC frames," and passing the FC frames, along with status information, to the host processor within the context of larger collections of FC frames, called FC sequences and FC exchanges. On the output side, the interface controller accepts host memory buffer references and control information from the host processor, transforms them into FC frames, within higher-level contexts of FC sequences and FC exchanges, and provides the FC frames to the transmitter component of the FC port for serial transmission to the FC. The interface controller also exchanges lower-level control messages with remote nodes via the FC that are used for configuring the FC, maintaining state within FC nodes, establishing temporary paths between nodes, arbitrating control of FC loops, acknowledging receipt of FC data frames, and extending data transfer credits to remote nodes, among other things.

The interface controller communicates with the host processor through a set of host memory-based data structures and through a number of control registers accessible to both the interface controller and the host processor via a local bus, such as a PCI bus. At any given instant, the interface controller may be handling outgoing FC frames associated with different FC sequences, and may be also handling inbound FC frames from the FC associated with a number of FC sequences. The interface controller uses internal caches to cache information from the host memory-based data structures with which the interface controller communicates with the host processor.

The interface controller plays an analogous function within an FC port as that played by a computer processor in a multi-tasking operating system environment. The interface controller handles many different events concurrently with extremely dynamic patterns of state changes and information flow. The state of an interface controller is maintained in a number of different dynamic data structures and queues, generally stored within host memory, and accessible to both the interface controller and the host. The state of each currently active FC exchange and FC sequence is maintained in these data structures, as well as descriptors that reference incoming and outgoing frames, completion messages for write and read operations, and other such information.

I/O operations may be conducted within the context of a SCSI I/O operation embedded within the FC protocol. An I/O operation is initiated by an initiator node in order to read data from, or write data to, a target node. At the conclusion of a write or read operation ("I/O operation"), the initiator node generally receives a FC response frame from the target node, whether or not the I/O operation successfully completes. This FC response frame is received by the interface controller from the FC, the data contents of the FC response frame are transferred to a buffer in host memory, and a completion notice is placed into a separate completion queue in host memory by the interface controller. Thus, data is sent from the interface controller to two different host memory locations upon reception by the initiating node of a response FC frame.

In FC controllers, as in operating systems and other real-time device controllers, queues are employed for buffering output data and input data. In a typical FC controller, inbound frames are received by the FC interface controller from the transceiver component of the FC node that contains the FC interface controller and placed into an inbound first-in-first-out ("FIFO") queue within the FC interface controller.

FC frames include FC data frames and FC link-control frames. One type of FC link-control frame is an acknowledgement ("ACK") frame. An FC node sends ACK frames to remote nodes from which the FC node has received FC data frames in order to acknowledge receipt of the FC data frames. FC nodes employ an end-to-end ("EE") credit management strategy in which an FC node must obtain credits prior to transmitting FC frames to a remote node. In addition to acknowledging receipt of an FC frame, ACK frames are used to transfer credits to a remote node to allow the remote node to send additional frames to an FC node. ACK frames are also employed for a number of additional functions that are beyond the scope of the current application.

Because, in typical FC interface controller implementations, a single inbound FIFO queue is used for queuing received FC frames, FC data frames and ACK frames are commonly interleaved within the inbound FIFO queue. FC data frames are generally much larger than ACK frames, and require more extensive processing than ACK frames by both the FC interface controller and host processor within an FC node. Processing of queued ACK frames may be temporarily blocked when the ACK frames are preceded in the inbound FIFO queue by FC data frames.

When processing of ACK frames queued to the inbound FIFO queue are temporarily blocked, the FC node fails to obtain credits from remote nodes in a timely fashion, resulting in blocking of transmission of outbound FC frames from the FC node to remote nodes. In certain cases, deadlock conditions may arise when processing of inbound ACK frames by two intercommunicating FC nodes is blocked. Such ACK frame processing blockages may increase the inter-frame gap on the FC link, increase the likelihood of EE credit timeouts, decrease bandwidth availability of the FC link, increase I/O latency, cause additional performance problems, and increase the number of loop arbitrations undertaken by an FC node during I/O transactions. For these reasons, FC interface controller architects, developers, and manufacturers, as well as users of FC-based networking and storage systems, have recognized a need for more optimal, non-blocking processing of FC data frames and ACK frames by FC interface controllers.

SUMMARY OF THE INVENTION

The present invention provides a method and FC interface controller implementation that employ separate FIFO queues for link-control frames and FC data frames to prevent FC data frames queued ahead of ACK frames from blocking ACK frame processing. In one embodiment of the present invention, an interface controller includes an inbound FC data frame FIFO queue and an inbound link-control frame queue. Thus, inbound FC data frames are queued separately from inbound ACK frames. Functionality that resides in an inbound data manager component of prior art FC interface controllers is, in FC interface controllers representing one embodiment of the present invention, moved to an outbound sequence manager component and an inbound frame router component, simplifying and streamlining processing of ACK frames. The present invention thus reduces the latency in converting ACK frames into credits, prevents a blockage in processing inbound FC data frames within the FC interface controller from blocking processing of inbound ACK frames and transformation of inbound ACK frames into credits, more completely separates the processing of inbound and outbound frames within the interface controller, and increases the efficiency of outbound frame processing and transmission by the FC interface controller. This, in turn, decreases the inter-frame gap on the FC link associated with the FC interface controller, decreases the likelihood of EE credit timeouts, increases bandwidth availability of the FC link, decreases I/O latency, increases general performance, and decreases the number of loop arbitrations undertaken by an FC node within an FC arbitrated loop topology during I/O transactions.

DETAILED DESCRIPTION OF THE INVENTION

Figure 1:
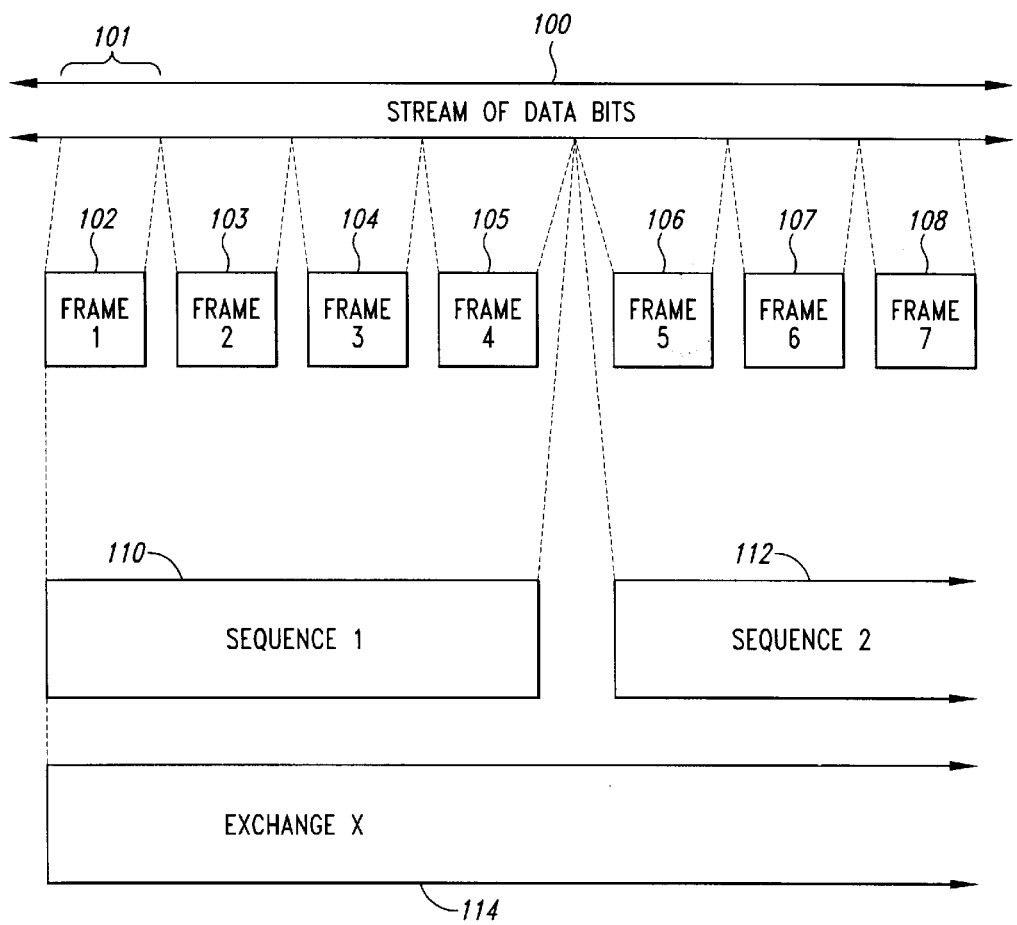
FIG. 1 illustrates a simple hierarchy by which data is organized, in time, for transfer through an FC network.

The present invention will be described below in four subsections. The first three subsections provide details about the FC, the FC protocol, the FC interface-controller architecture, and problems associated with queuing both FC data frames and ACK frames to a single FIFO queue within an FC interface controller. The fourth subsection provides a description of the present invention.

Fibre Channel

The fibre Channel ("FC") is defined by, and described in, a number of ANSI Standards documents, including: (1) fibre Channel Physical and Signaling Interface ("FC-PH"), ANSI X3.230-1994, ("FC-PH-2), ANSI X3.297-1997; (2) fibre Channel—Arbitrated Loop ("FC-AL-2"), ANSI X3.272-1996; (3) fibre Channel—Private Loop SCSI Direct Attached ("FC-PLDA"); (4) fibre Channel Fabric Loop Attachment ("FC-FLA"); (5) fibre Channel Protocol for SCSI ("FCP"); (6) fibre Channel Fabric Requirements ("FC-FG"), ANSI X3.289:1996; and (7) fibre Channel 10-Bit Interface. These standards documents are under frequent revision. Additional fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

In the following discussion, "FC" is used as an adjective to refer to the general fibre Channel architecture and protocol, and is used as a noun to refer to an instance of a fibre Channel communications medium. Thus, an FC (architecture and protocol) port may receive an FC (architecture and protocol) sequence from the FC (communications medium).

The FC protocol is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibres. An FC node is connected to a communications medium via at least one FC port and FC link. An FC port is an FC host adapter or FC controller that shares a register and host memory interface with the host processing components of the FC node, and that implements, in hardware and firmware, the lower levels of the FC protocol. The FC host generally exchanges data and control information with the FC port using shared data structures in shared memory and using control registers in the FC port. The FC port includes serial transmitter and receiver components coupled to a communications medium via an FC link that comprises electrical wires or optical strands.

The FC is a serial communications medium. Data is transferred one bit at a time at extremely high transfer rates. FIG. 1 illustrates a very simple hierarchy by which data is organized, in time, for transfer through an FC network. At the lowest conceptual level, the data can be considered to be a stream of data bits 100. The smallest unit of data, or, grouping of data bits, supported by an FC network is a 10-bit character that is decoded by FC port as an 8-bit character. FC primitives are generally composed of four 10-bit characters or bytes. Certain FC primitives are employed to carry control information exchanged between FC ports. The next level of data organization, a fundamental level with regard to the FC protocol, is a frame. Seven frames 102–108 are shown in FIG. 1. A frame may be composed of between 36 and 2,148 bytes of data, depending on the nature of the data included in the frame. The first FC frame, for example, corresponds to the data bits of the stream of data bits 100 encompassed by the horizontal bracket 101. The FC protocol specifies a next higher organizational level called the sequence. A first sequence 110 and a portion of a second sequence 112 are displayed in FIG. 1. The first sequence 110 is composed of frames one through four 102–105. The second sequence 112 is composed of frames five through seven 106–108 and additional frames that are not shown. The FC protocol specifies a third organizational level called the exchange. A portion of an exchange 114 is shown in FIG. 1. This exchange 114 is composed of at least the first sequence 110 and the second sequence 112 shown in FIG. 1. This exchange can alternatively be viewed as being composed of frames one through seven 102–108, and any additional frames contained in the second sequence 112 and in any additional sequences that compose the exchange 114.

The FC is a full duplex data transmission medium. Frames and sequences can be simultaneously passed in both directions between an originator, or initiator, and a responder, or target. An exchange comprises all sequences, and frames within the sequences, exchanged between an initiator, or originator, and a responder, or target, during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC. The discussion below will relate only to the FCP protocol on the FC and to the SCSI protocol discussed above.

FC Protocol

Figure 2:
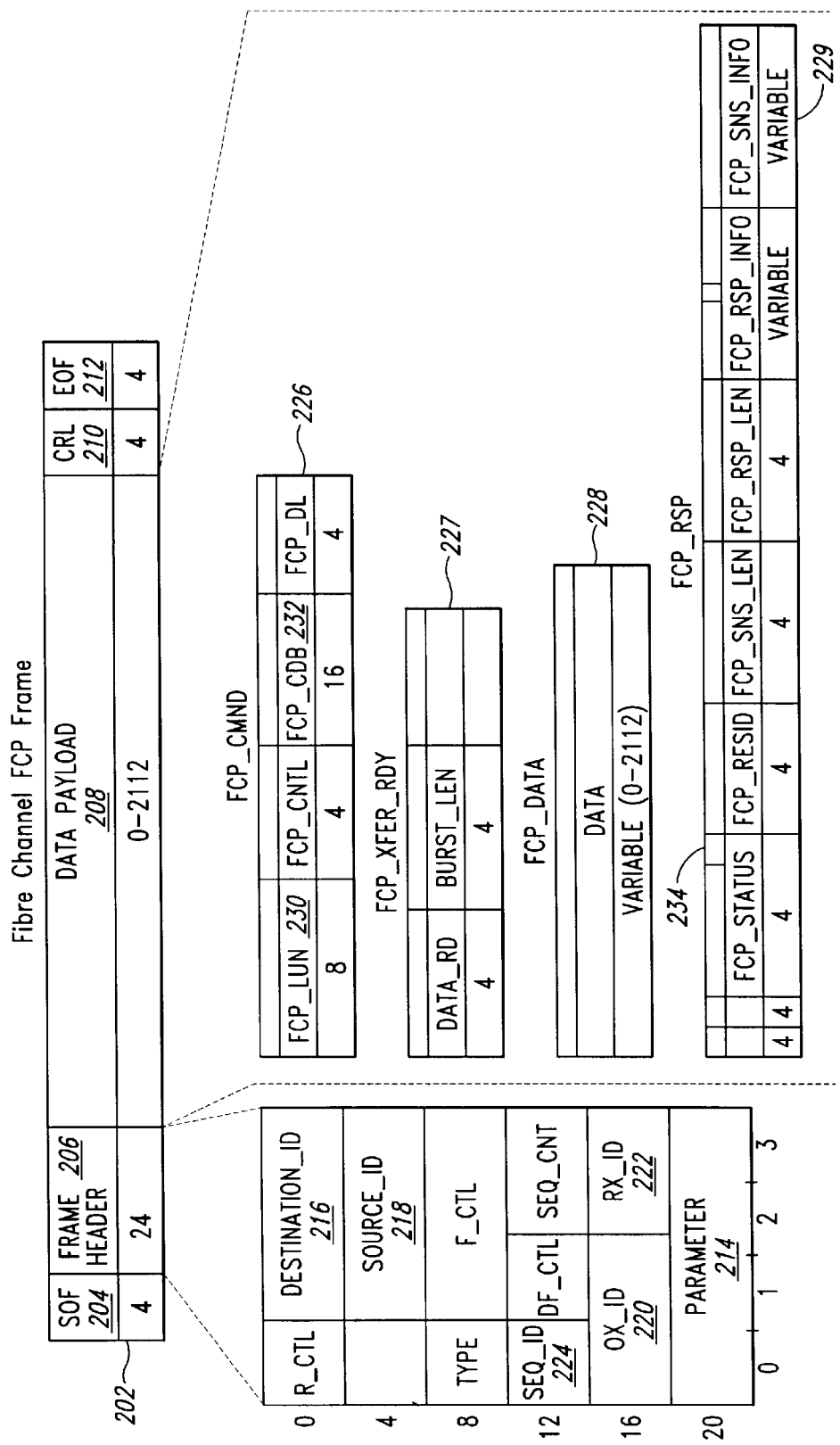
FIG. 2 illustrates the conceptual contents of an FC frame.

FIG. 2 illustrates the conceptual contents of an FC frame. The FC frame 202 comprises five high-level sections 204, 206, 208, 210 and 212. The first high-level section, called the start-of-frame delimiter 204, comprises 4 bytes that mark the beginning of the frame. The next high-level section, called frame header 206, comprises 24 bytes that contain addressing information, sequence information, exchange information, and various control flags. A more detailed view of the frame header 214 is shown expanded from the FC frame 202 in FIG. 2. The destination ID 216 is a 24-bit FC address indicating the destination port for the frame. The source ID 218 is a 24-bit address that indicates the port that transmitted the frame. The originator ID, or OX_ID 220, and the responder ID 222, or IX_ID, together compose a 32-bit exchange ID that identifies the exchange to which the frame belongs. The sequence ID 224 identifies the sequence to which the frame belongs.

The next high-level section 208, called the data payload, contains the actual data packaged within the FCP frame. The data payload can be formatted according to four basic types of data payload layouts 226–229. The first of these layouts 226, called the FCP_CMND, is used to send a SCSI command from an initiator to a target. The FCP_LUN field 228 comprises a 8-byte address that specifies a particular SCSI adapter, a target device associated with that SCSI adapter, and a logical unit number corresponding to a physical device associated with the specified target SCSI device. An SCSI command is contained within the 16-byte field FCP_CDB 230. The second type of data payload format 227 shown in FIG. 2 is called the FCP_XFER+e,dus RDY layout. This data payload format is used to transfer a proceed command from the target to the initiator when the target is prepared to begin receiving or accepting data. The third type of data payload format 228 shown in FIG. 2 is the FCP_DATA format, used for transferring the actual data that is being read or written as a result of execution of an I/O transaction. The final data payload layout 229 shown in FIG. 2 is called the FCP_RSP layout, used to transfer a SCSI status byte 234, as well as other FCP status information, from the target back to the initiator upon completion of the I/O transaction. In the following discussion, an FC frame containing an FCP_CMND, FCP_XFER_RDY, FCP_DATA, or FCP_RSP data payload will be referred to as an FCP_CMND frame, FCP_XFER_RDY frame, FCP_DATA frame, or FCP_RSP frame, respectively.

The FC protocol supports two major types of FC frames. The first type is the FC data frame. FC data frames include FC link_frames, FC device_frames, and FC video_frames. FC data frames are all characterized by having data payload fields (208 in FIG. 2) that contain data. Thus, the FCP_CMND, FCP_XFER_RDY, FCP_DATA, and FCP_RSP frames, described above, are examples of FC data frames.

A second type of FC frame is the link-control frame. Link-control frames include ACK frames, link-response frames, and link_command frames. Link_control frames are characterized by having no data payload field. Link_response frames are generally sent to indicate unsuccessful delivery of one or more FC data frames. Link-control frames are employed for low-level functions, such as reset functions. As described above, ACK frames are used, among other things, to acknowledge successful receipt of FC data frames as well as to transfer credits to a remote node to allow the remote node to send additional FC data frames.

Figure 3:
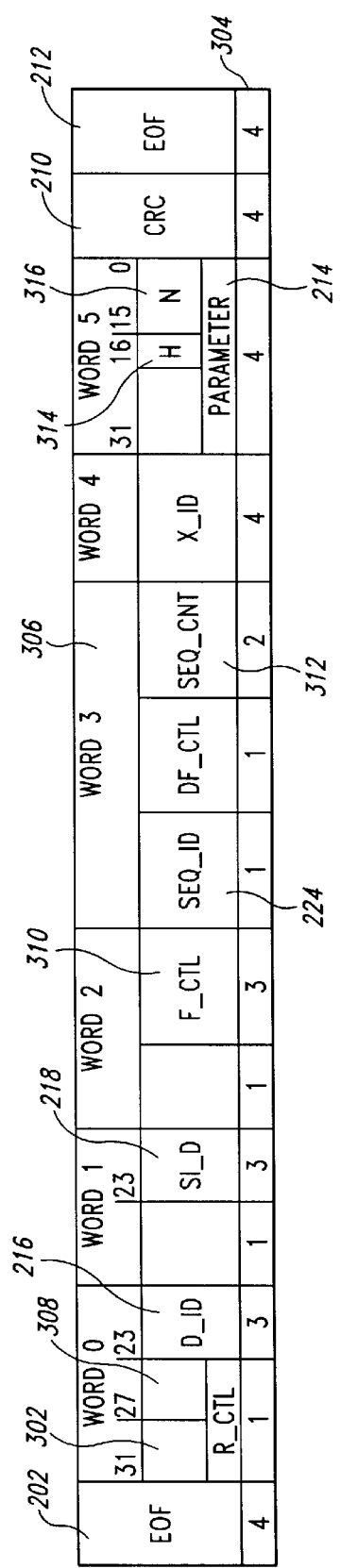
FIG. 3 shows the layout of an ACK frame.

FIG. 3 shows the layout of an ACK frame. In FIG. 3, the fields of an ACK frame are laid out in byte order. The lowest row 304 in FIG. 3 indicates the number of bytes within the field, and the upper row 306 indicates word boundaries and, for certain fields, bit numbering within the word. Fields previously shown in FIG. 2 are labeled with the same numerical label used in FIG. 2. FC link-control frames are distinguished from FC data frames by the contents of the high four bits of the R_CTL fields 302. When these four bits contain the binary value "1100," the frame is a link-control frame; otherwise, the frame is an FC data frame. The next-lowest four bits of the R_CTL field 308 indicate the type of link-control frame. The FC supports three different types of ACK frames: (1) ACK_1, an acknowledgement of a single FC data frame; (2) ACK_N, an acknowledgement of n FC frames; and (3) ACK_0, an acknowledgement of all FC data frames within an FC sequence. The second-highest four bits of the R_CTL field 308 have the binary value "0001" for ACK_0 and ACK_N-type ACK frames and the binary value "0000" for ACK_1-type ACK frames. The D_ID field 216 identifies the source of the FC data frame or FC data frames for which the ACK frame is an acknowledgement and the S_ID field 218 identifies the node sending the ACK frame. The SEQ_ID field 224 identifies the sequence that includes the FC data frame being acknowledged, and the SEQ_CNT field 312 indicates the lowest-number FC data frame in the sequence for which the ACK frame is an acknowledgement. The PARAMETER field 214 contains an H bit 314 that indicates whether or not acknowledgements for all previously transmitted FC data frames have been sent or, in other words, if FC data frame delivery has succeeded up to the point in the FC sequence occupied by the highest-order FC data frame for which the ACK frame serves as acknowledgement, and the lowest 16 bits of the PARAMETER field 214 comprise an N field 316 that contains the number of FC data frames being acknowledged by the ACK frame, or, for ACK_0-type ACK frames, the value "0." For ACK_1-type ACK frames, the value of the N field 316 is "1." and for ACK_N-type ACK frames, the value is n.

Figure 4A:
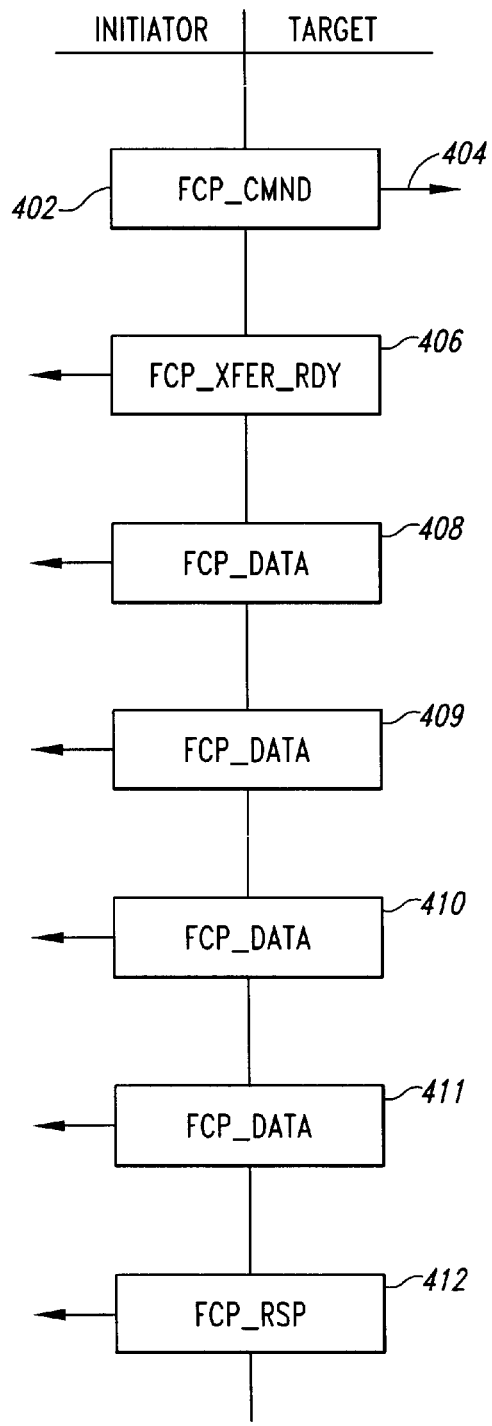
FIGS. 4A and 4B illustrate a generalized sequence of FC frames exchanged between an initiator node and a target node during a read I/O operation and a write I/O operation, respectively.
Figure 4B:
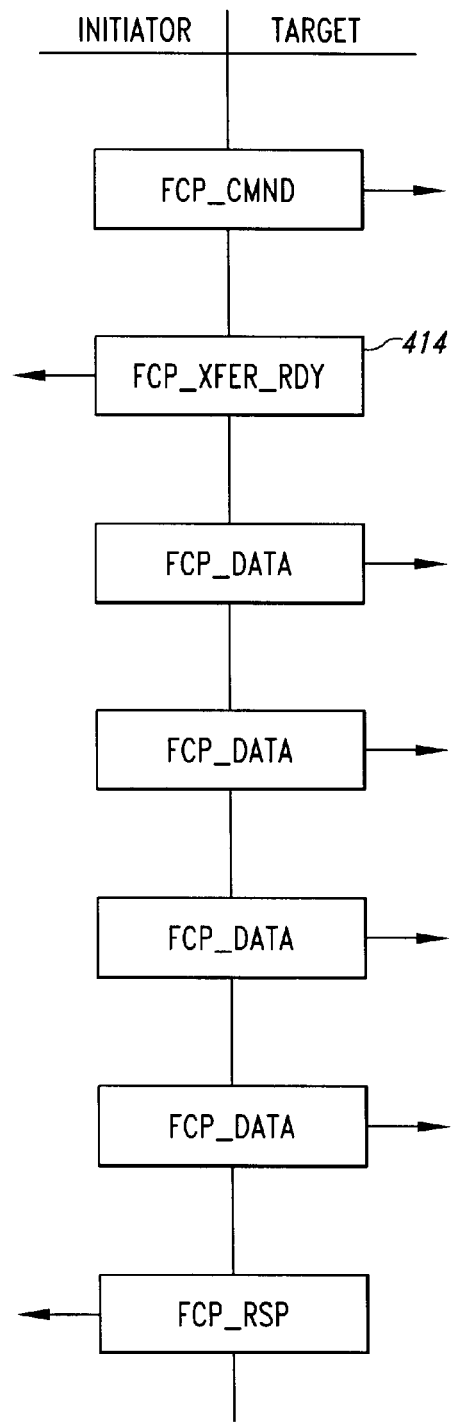

FIGS. 4A and 4B illustrate a generalized sequence of FC frames exchanged between an initiator node and a target node during a read I/O operation and a write I/O operation, respectively. In both figures, FC frames are represented as rectangles, such as FC frame 402, and arrows, such as arrow 404, indicate the direction that the FC frame is sent. Arrows pointing towards the right, such as arrow 404, indicate that an FC frame is transmitted from an initiator node to a target node, and arrows pointing to the left indicate that an FC frame is transmitted from a target node to an initiator node. The sequence of FC frames in both figures proceeds from an initial FC frame, at the top of the figures, to a final FC frame, at the bottom of the figures, in time order.

A read I/O operation is initiated when an initiator node sends an initial FC sequence comprising a FCP_CMND frame 402 through the FC to the target node. After the target node receives the FCP_CMND frame, and prepares itself for the read operation, the target node may send a second FC sequence comprising an FCP_XFER+e,dus RDY frame 406 back to the initiator node to indicate that data transmission can now proceed. This sending of an FCP_XFER+e, dus RDY frame by the target node is optional, in the case of a read I/O operation. The target node then reads data from a physical device and transmits that data as a number of FCP_DATA frames 408–411, together composing a third sequence of the exchange corresponding to the I/O read transaction, to the initiator node through the FC. When all the data has been transmitted, and the target node packages a status byte into an FCP_SP frame 412 and transmits the FCP_RSP frame back to the initiator node through the FC. This completes the read I/O operation.

FIG. 4B shows, in similar fashion to FIG. 4A, an example of FC frames exchanged during a write I/O transaction between an initiator node and a target node. FIG. 4B differs from FIG. 4A only in the fact that, during a write I/O operation, the FCP_DATA frames are transmitted from the initiator node to the target node over the FC and the FCP_XFER+e,dus RDY FC frame 414 sent from the target node to the initiator node is not optional, as in the case of the read I/O operation, but is instead mandatory.

Figure 5A:
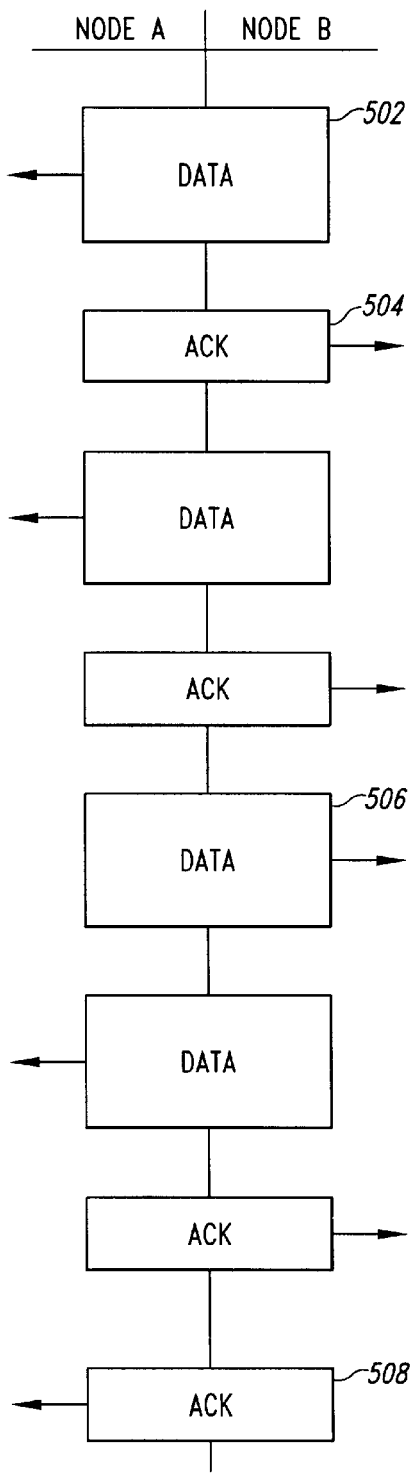
FIGS. 5A–C illustrate ACK frames interleaved with FC data frames.
Figure 5B:
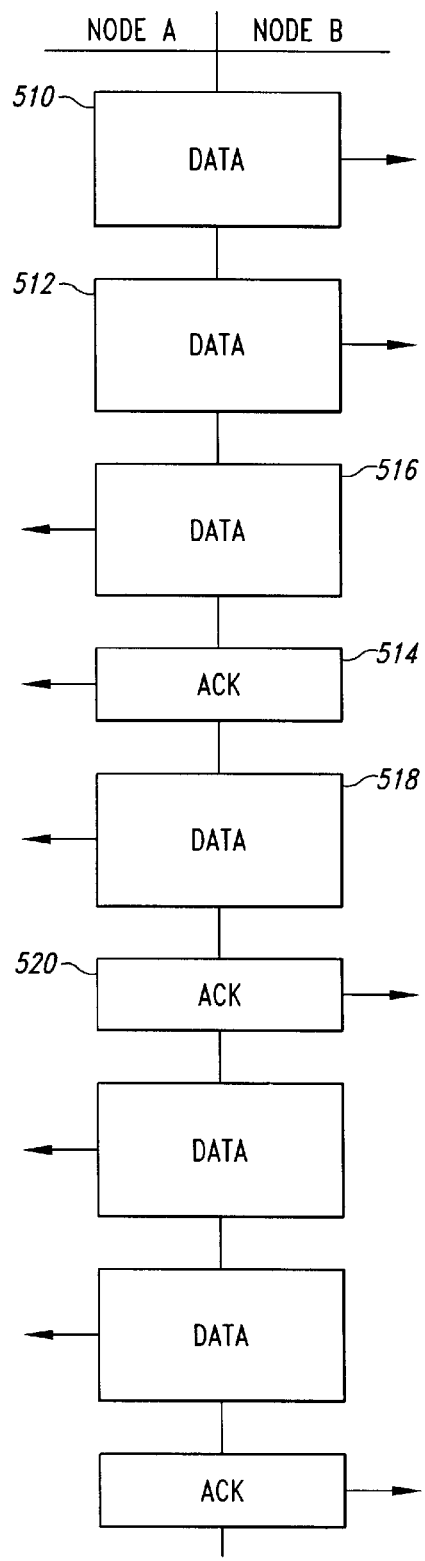
Figure 5C:
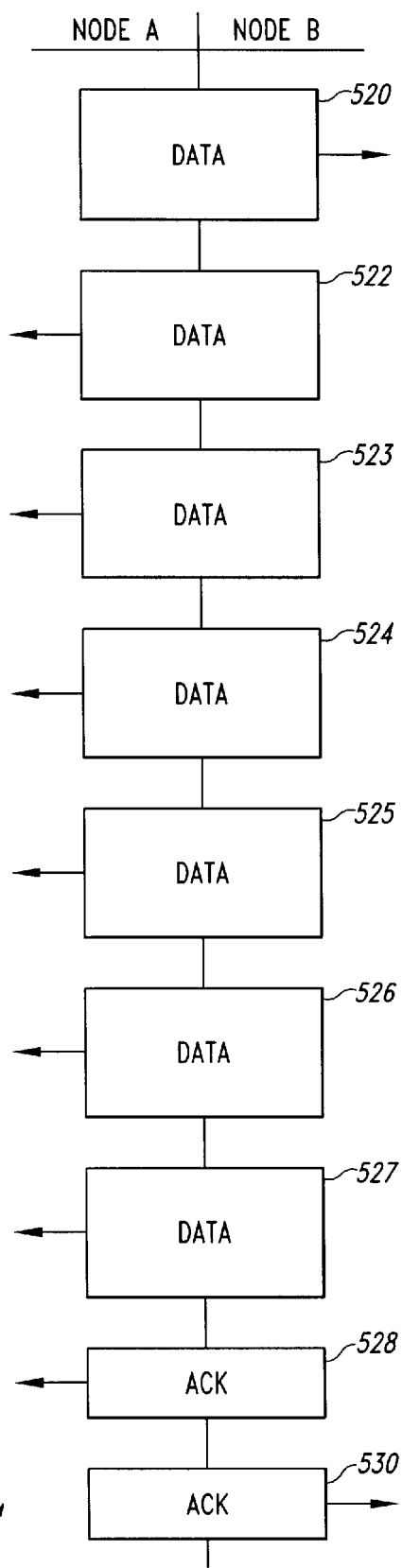

FIG. 5A–C illustrate ACK frames interleaved with FC data frames during FC data frame exchange between two nodes. FIGS. 5A–C employ the same illustration conventions as employed in FIGS. 4A and B. Because the FC is a full-duplex communications, medium, FC sequences can be concurrently transmitted and received by an FC node. Moreover, even within a single FC sequence, FC data frames may be transmitted in both directions between an initiator node and a target node. No attempt is made in FIGS. 5A–C to assign FC data frames to particular sequences or higher-level protocol operations. It is assumed that Nodes A and B in FIGS. 5A–C operate in full-duplex mode and thus may concurrently receive and transmit FC sequences.

FIG. 5A illustrates the use of the ACK_1-type ACK frames. In FIG. 5A, Node B sends FC data frames 502 to Node A and Node A replies with ACK frames 504 acknowledging FC data frames 502. FIG. 5A also illustrates Node A sending a data frame 506 to Node B, which is acknowledged by ACK frame 508. As can be seen in FIG. 5A, each FC data frame is specifically acknowledged by an ACK frame transmitted in the opposite direction from the FC data frame. Once Node A transmits as many FC data frames to Node B as Node A has credits for, then Node A may not transmit another FC data frame to Node B until Node A receives an ACK frame corresponding to one of the transmitted FC data frames and therefore again has a credit for transmitting FC frames to Node B. ACK_1 ACK frames each acknowledge a single FC data frame and transfer a single credit to the receiving FC node.

FIG. 5B illustrates the use of ACK_N-type ACK frames. In FIG. 5B, each ACK_N-type ACK frame acknowledges two FC data frames. Thus, for example, Node A sends a first FC data frame 510 and a second FC data frame 512 to Node B and subsequently receives a single ACK_N-type ACK frame 514 to acknowledge successful delivery of FC data frames 510 and 512. In similar fashion, Node A acknowledges the receipt of FC data frames 516 and 518 with an ACK_N-type FC acknowledgement frame 520. ACK_N-type ACK frames transfer n credits to the receiving FC node.

FIG. 5C illustrates the use of ACK_0-type ACK frames. ACK_0-type ACK frames acknowledge all FC data frames transmitted as part of an FC sequence. Thus, in FIG. 5C, Node A sends an FC data frame 520 to Node B, and Node B transmits 6 FC data frames 522–527 to Node A as part of a single FC sequence. Finally, Node A receives an ACK_0-type ACK frame 528 from Node B and Node B receives an ACK_0-type ACK frame 530 from Node A. Note that the first ACK frame 528 may be received by Node A from Node B prior to reception of some or all of the FC data frames 522–527 received by Node A from Node B. Like ACK_N-type ACK frames, ACK_0-type ACK frames transfer multiple credits to the receiving FC node.

Both nodes involved in an FC sequence exchange employ the same type of ACK frames. The type of ACK frame used by the nodes may be determined during a login procedure, or may be later negotiated by the nodes. In general, the ACK_1 type of FC ACK node is the default ACK frame employed.

FC Interface-Controller Architecture

Figure 6:
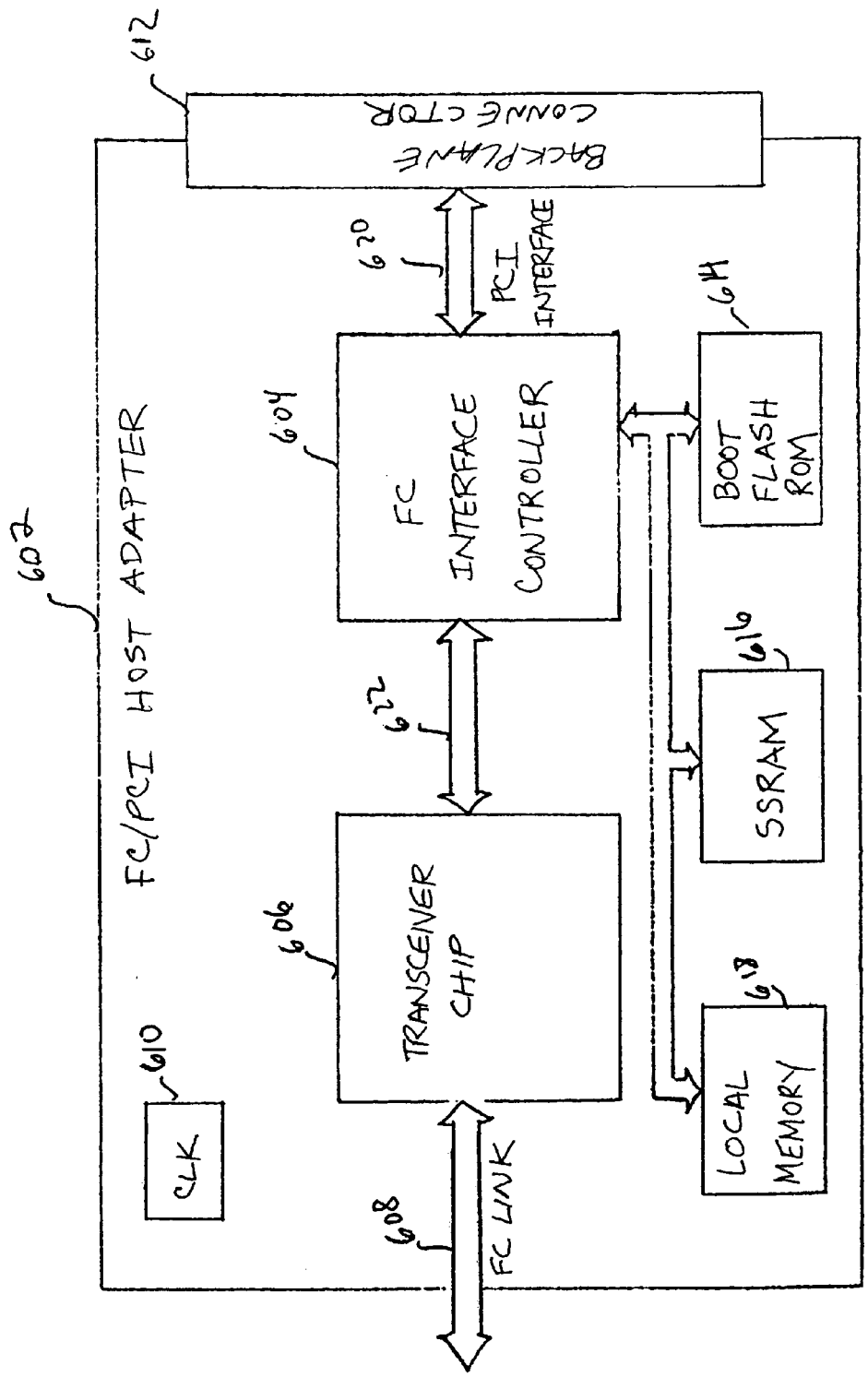
FIG. 6 shows a typical FC interface controller incorporated into a typical FC/PCI host adapter.

FIG. 6 shows a typical FC Interface Controller ("FCIC") incorporated into a typical FC/PCI host adapter. The FC/PCI host adapter 602 comprises the FCIC 604, a transceiver chip 606, an FC link 608, a clock 610, a backplane connector 612, and, optionally, a boot flash ROM 614, a local synchronous static random access memory ("RAM") 616, and a local memory 618. The FC/PCI host adapter 602 communicates with the processor or processors of an FC node via the backplane connector 612 and a PCI bus within the FC node to which the processor or processors are coupled. The FCIC 604 is coupled to the backplane connector 612 via a PCI interface 620. The FCIC sends and receives FC frames to and from an FC via a 10-bit interface 622 that couples the FCIC to the transceiver chip 606, which is, in turn, coupled to the FC via the FC link 608. The clock 610 interfaces to various FC host adapter components to provide timing signals for synchronizing operations of the components. The FC host adapter 602 may serve, in terms of the previous discussion, as an FC port, and the FC host adapter 602 together with the computer system to which it is coupled via the backplane connector 612, compose an FC node that may be connected via the FC link 608 to the FC.

Figure 7:
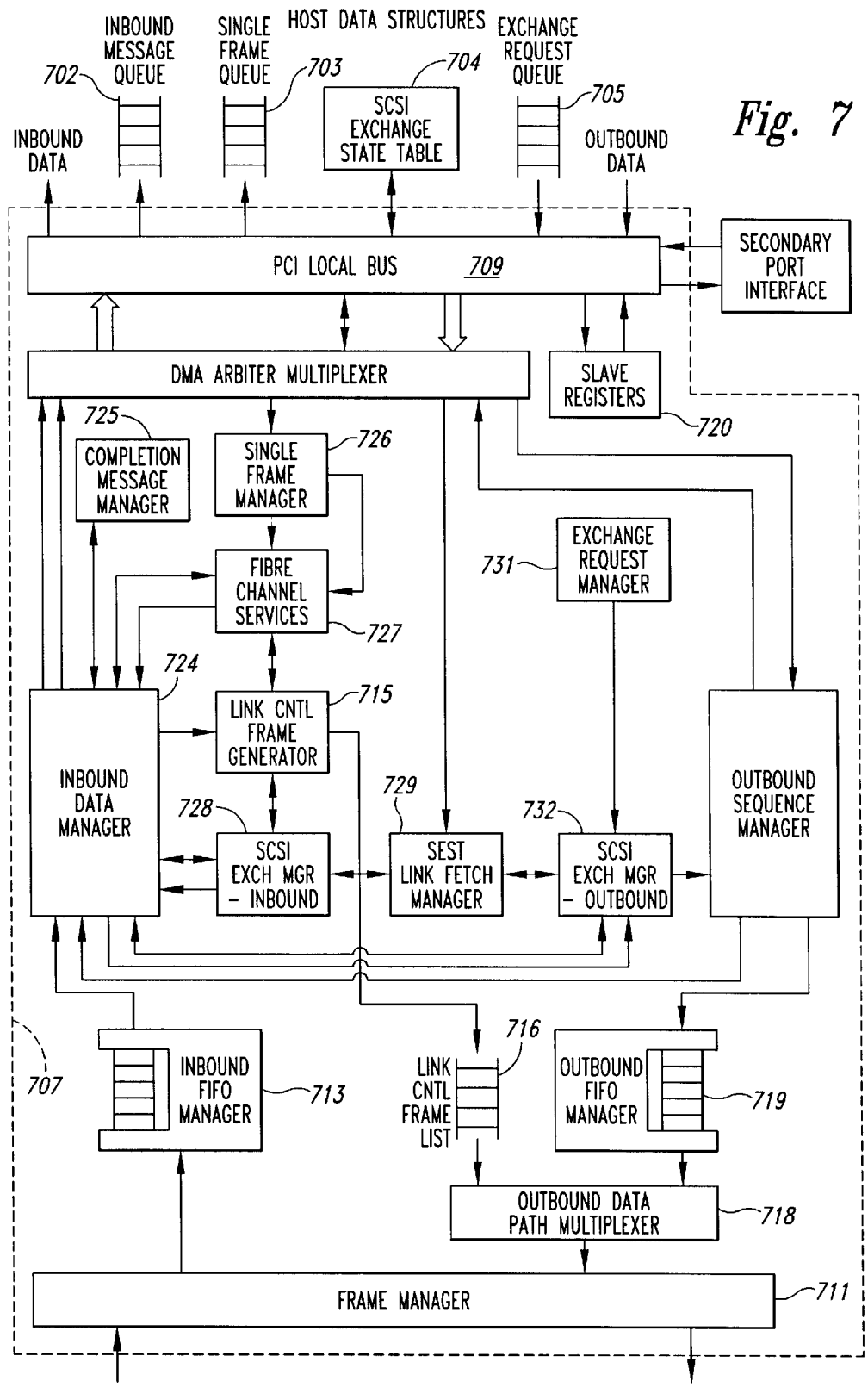
FIG. 7 shows a block diagram of a typical FC interface controller and the memory-based data structure interface between the typical FC interface controller and a host.

FIG. 7 shows a block diagram description of a typical FC interface controller and the memory-based data structure interface between a typical FC interface controller and a host. The memory-based data structures 702–705 are maintained in a memory component of the host processor accessible to the FCIC via the PCI bus 709. In FIG. 7, the FCIC 707 is represented as being combined with the backplane connector (412 in FIG. 4) and PCI bus 709. The FCIC interfaces with a transceiver chip (606 in FIG. 6) via a 10 bit/8 bit decoder and 8 bit/10 bit encoder that together comprise a 10-bit interface to which a frame manager 711 interfaces. The frame manager 711 receives FC frames for transmission to the transceiver chip (606 in FIG. 6) from the FCIC via an outbound FIFO manager 719 and outbound data path multiplexer 718 and receives a stream of data bits from the transceiver chip (606 in FIG. 6) via the 10 bit/8 bit decoder interface, processes the received data bits into FC frames, and stores the FC frames into an inbound FIFO manager 713. Both the outbound and inbound FIFO managers 719 and 713 buffer frames, allowing for pipelining of outbound frames and cyclic redundancy check ("CRC") validation of inbound frames, respectively. The essence of both the outbound and inbound FIFO managers 719 and 713 is a FIFO queue, and outbound and inbound FIFO managers 719 and 713 are also referred to as the "outbound FIFO queue" and "inbound FIFO queue," respectively.

A link control frame generator 715 modifies FC frame headers of received FC data frames to create FC link-control frames, principally ACK frames, and places the generated FC link-control frames into an FC link-control frame list 716 for transmission to the FC. The outbound data path multiplexer 718 retrieves outbound FC link-control frames from the FC link-control frame list 716 and outbound FC data frames from the outbound FIFO manager 719 to send to the frame manager 711. The link-control frame generator uses FC headers of received FC data frames to create ACK frames that are sent in response to successfully delivered and received FC data frames. The link-control frame generator updates the high 8-bits of the R_CTL field, the H and N subfields of the parameter field, as well as interchanging the D_RD and S_RD fields of a received FC data frame in order to generate a corresponding ACK frame.

The host processor of the FC node controls and exchanges information with the FCIC by writing and reading various control registers 720 and by placing data into, and removing data from, the memory-based data structures 702–705. Internal components of the FCIC 724–732 read and write the control registers 722, receive data from, and place data into, the memory based data structures 702–705, and exchange FC frames with the frame manager 711 via the inbound FIFO manager 713 and the outbound FIFO manager 719.

The inbound message queue ("IMQ") 702 contains completion messages that notify the host processor of inbound and outbound transaction information and status information. The single frame queue ("SFQ") 703 contains inbound unknown or unassisted FC frames that the FCIC 707 receives from the frame manager 711 and places into the SFQ. The SCSI exchange state table ("SEST") 704 is shared between the FCIC and the host and contains SEST entries that each corresponds to a current SCSI exchange (I/O operation). The exchange request queue ("ERQ") 705 contains I/O request blocks ("IRBs") that represent I/O requests initiated by the host or by remote FC nodes.

The completion message manager 725 manages the IMQ and provides queue entries to the inbound data manager 724 into which the inbound data manager places completion messages. The single frame manager 726 manages the SFQ in host memory and provides entries to the FC services component 727 into which the FC component services place inbound frames. The exchange request manager 731 fetches new entries from the ERQ and sends them to the SCSI exchange manger-outbound ("SEM-OUT") 732 for processing. The inbound data manager 724 informs the inbound frame processors, i.e. the SCSI exchange manager-inbound ("SEM-IN") 728 and FC services component 727 of new frames and routes the frames to their proper destination in the host. Also, the inbound data manager sends completion messages to the host via the IMQ 702. The FC services component 727 manages the FC frames that the SEM-IN 728 does not manage. The FC services component places the frames in the SFQ 703. The SEM-IN 728 manages the phases of a SCSI exchange that receive an FC sequence. The SEM-IN reads the SEST entries via the SEST link fetch manager 729 and either sends the inbound data to the proper host buffers or sends the request to the SEM-OUT 732 to send the next phases of an FC sequence. The SEST link fetch manager 729 is responsible for reading and writing SEST entries, depending upon requests from the SEM-IN 728 and SEM-OUT 732 components. The SEM-OUT 732 manages the phases of a SCSI exchange that require an FC sequence to be sent. The SEM-OUT 732 reads the SEST entries via the SEST link fetch manager 729, builds the request to send those sequences, and sends the requests to the outbound sequence manager 730. The outbound sequence manager ("OSM") 730 processes requests from the SEM-OUT 732 to send FC sequences from the host and retrieves FC frame headers and payloads from the host to send to the remote node. The OSM segments the sequence into FC frames of up to 2 KByte in size and queues them into the outbound FIFO manager 714.

Figure 8:
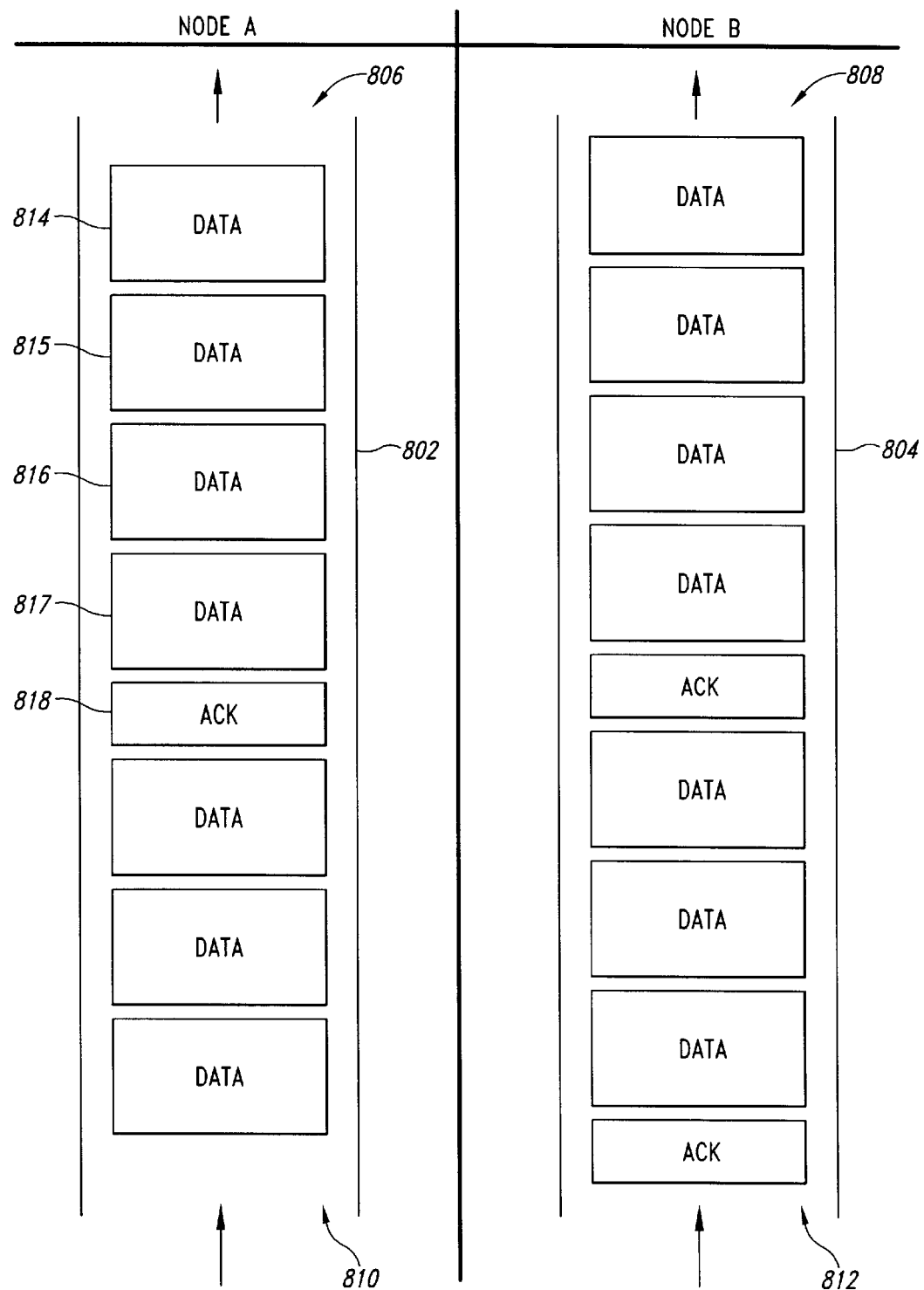
FIG. 8 illustrates inbound FIFO frame backup.

Because the typical FC interface controller employs a single inbound FIFO queue (713 in FIG. 7), FC data frames are commonly interleaved with ACK frames within the inbound FIFO queue. This may result in a temporary delay of ACK frame processing while previously-queued FC data frames are processed by the FC interface controller and host processor. FIG. 8 illustrates inbound FIFO frame backup.

FIG. 8 shows the inbound FIFO queues 802 and 804 of two intercommunicating FC nodes A and B. FC frames are removed from the top of the inbound FIFO queues 806 and 808 for processing by the FC interface controllers of Node A and B and are queued to the bottoms of the inbound FIFO queues 810 and 812 as the inbound FC frames are received by the transceiver component of the FC node and processed by the frame manager (711 in FIG. 7). In inbound FIFO queue 802, four FC data frames 814–817 precede an ACK frame 818 in the inbound FIFO queue 802. Thus, the four FC data frames 814–818 must be dequeued and processed by the inbound data manager (724 in FIG. 7) before the ACK frame 818 can be dequeued and processed. A similar situation exists in inbound FIFO queue 804 for Node B. In both cases, the ACK frame represents a credit received from the other FC node that, when processed, allows the receiving FC node to transmit one or more additional FC data frames to the FC node that sent the ACK frame. However, the credit cannot be processed, and additional FC data frames cannot be transmitted, until all previously queued FC data frames are processed. FC data frames are generally much longer than ACK frames, and require more extensive processing by the inbound data manager and, ultimately, by the host processor. Blockage of ACK frame processing by stalled processing of FC data frames in both inbound FIFO queues may cause a deadlock condition in which neither node A nor Node B can receive credits for transmitting additional FC data frames. Such deadlock conditions are resolved with time outs and retransmission of aborted FC sequences.

An initial manifestation of the delay in processing ACK frames due to current implementations of FC controllers having a single inbound FIFO queues is a delay in posting of credits that allow outbound FC data frames to be transmitted to remote FC nodes. This delay, in and of itself, may cause significant performance problems and I/O latencies in the FC links associated with the FC nodes containing such FC interface controllers, and in the FC in general. However, many additional problems may arise. For example, delays in transmitting outbound FC frames may tax host memory availability for storing outbound data, ultimately resulting in a decrease in the number of I/O transactions that can be processed by an FC node concurrently. Delays in transmitting outbound FC frames may translate into increased time intervals between outbound frames, effectively decreasing the bandwidth for data transfer through a FC link. As delays in transmitting outbound FC frames increase, the likelihood that either or both FC nodes involved in the exchange of an FC sequence may experience EE credit timeouts increases. An EE credit timeout may result in re-transmission of all previously transmitted FC data frames within an aborted FC sequence. Similarly, in FC arbitrated loop topologies, delays in processing ACK frames that cause delays in transmitting outbound FC frames may cause an FC node to repeatedly re-arbitrate for control of the FC arbitrated loop in order to complete transmission of a single FC sequence.

Figure 9:
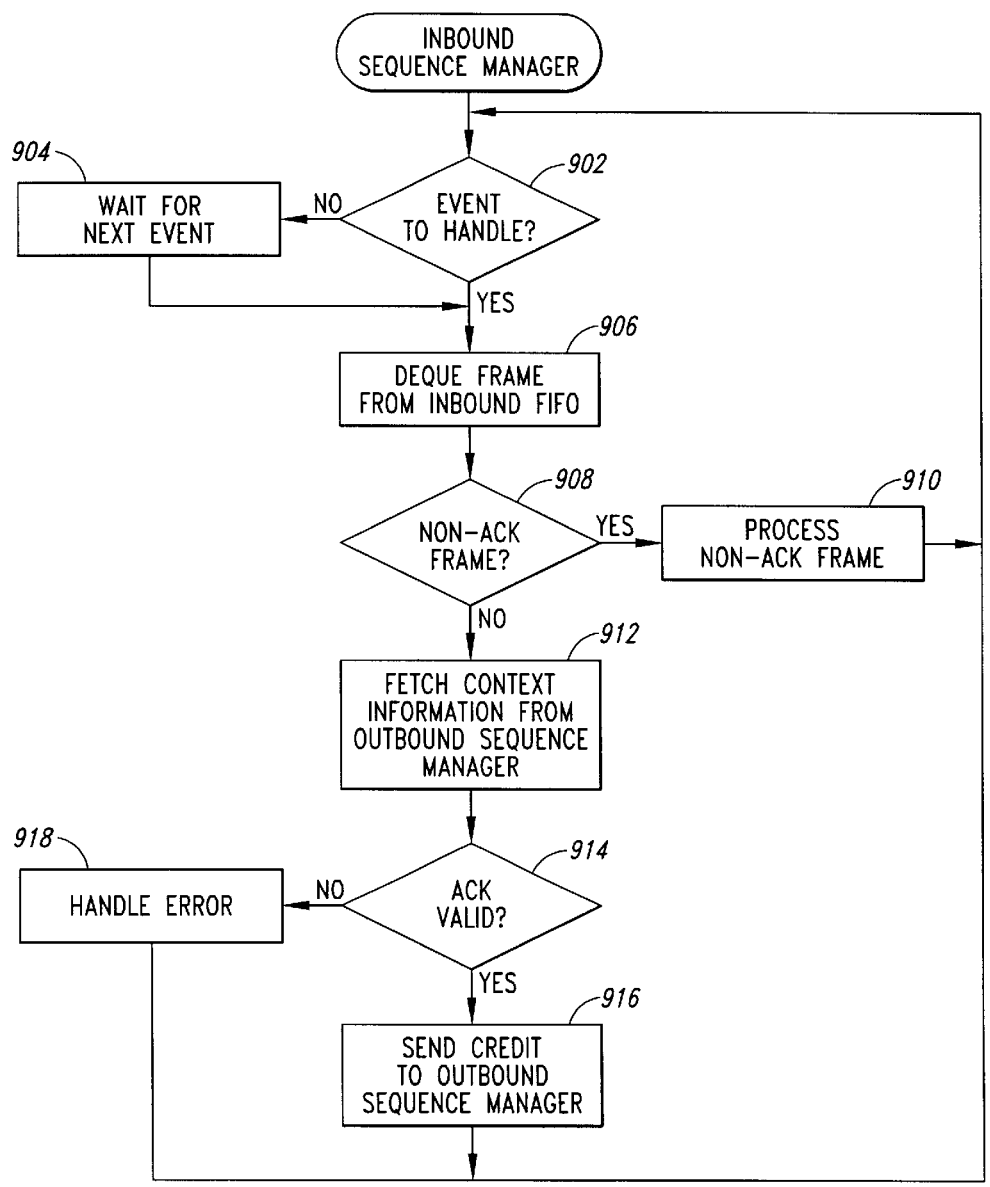
FIG. 9 is a flow control diagram for the inbound data manager.

FIG. 9 is a flow-control diagram for the inbound data manager. The flow-control diagram of FIG. 9 is not intended as a comprehensive flow-control diagram for all inbound data manager tasks, but is instead directed to processing of FC data frames and ACK frames queued to the inbound FIFO queue (713 in FIG. 7). In step 902, the inbound data manager determines whether or not there is a next inbound FIFO queue event to handle. If not, then the inbound data manager waits for the next event, in step 904. In step 906, the inbound data manager dequeues the least-recently queued FC frame from the inbound FIFO queue. In step 908, the inbound data manager determines whether or not the dequeued FC frame is an ACK frame. If the dequeued FC frame is not an ACK frame, then the inbound data manager, in step 910, processes the dequeued FC frame. For FC data frames, the inbound data manager may update data information describing the state of the FC sequence to which the dequeued FC frame belongs, and may initiate transfer of all or a portion of the FC frame to memory buffers in host memory. Processing of non-ACK FC link-control frames may also involve update of state information, as well as interaction with the outbound sequence manager (730 in FIG. 7) so that the control effect represented by the FC link-control frame is realized with respect to transmission of outbound FC data frames. In the case that the dequeued FC frame is an ACK frame, as determined in step 908, the inbound data manager, in step 912, fetches context information from the outbound sequence manager in order to determine the validity of the dequeued ACK frame. Such information related to the state of the FC sequence to which the ACK frame belongs. If the inbound data manager, in step 914, determines that the ACK frame is valid, then, in step 916, the inbound data manager posts one or more credits to the outbound sequence manager, depending on the type of ACK frame, that allow the outbound sequence manager to transmit additional FC data frames to the remote node that sent the ACK frame. If the dequeued ACK frame is not valid, within the context of the information fetched from the outbound sequence manager in step 912, then the inbound data manager, in step 918, handles the invalidity of the ACK frame by placing the ACK frame into the SFQ for the host to handle.

Figure 10:
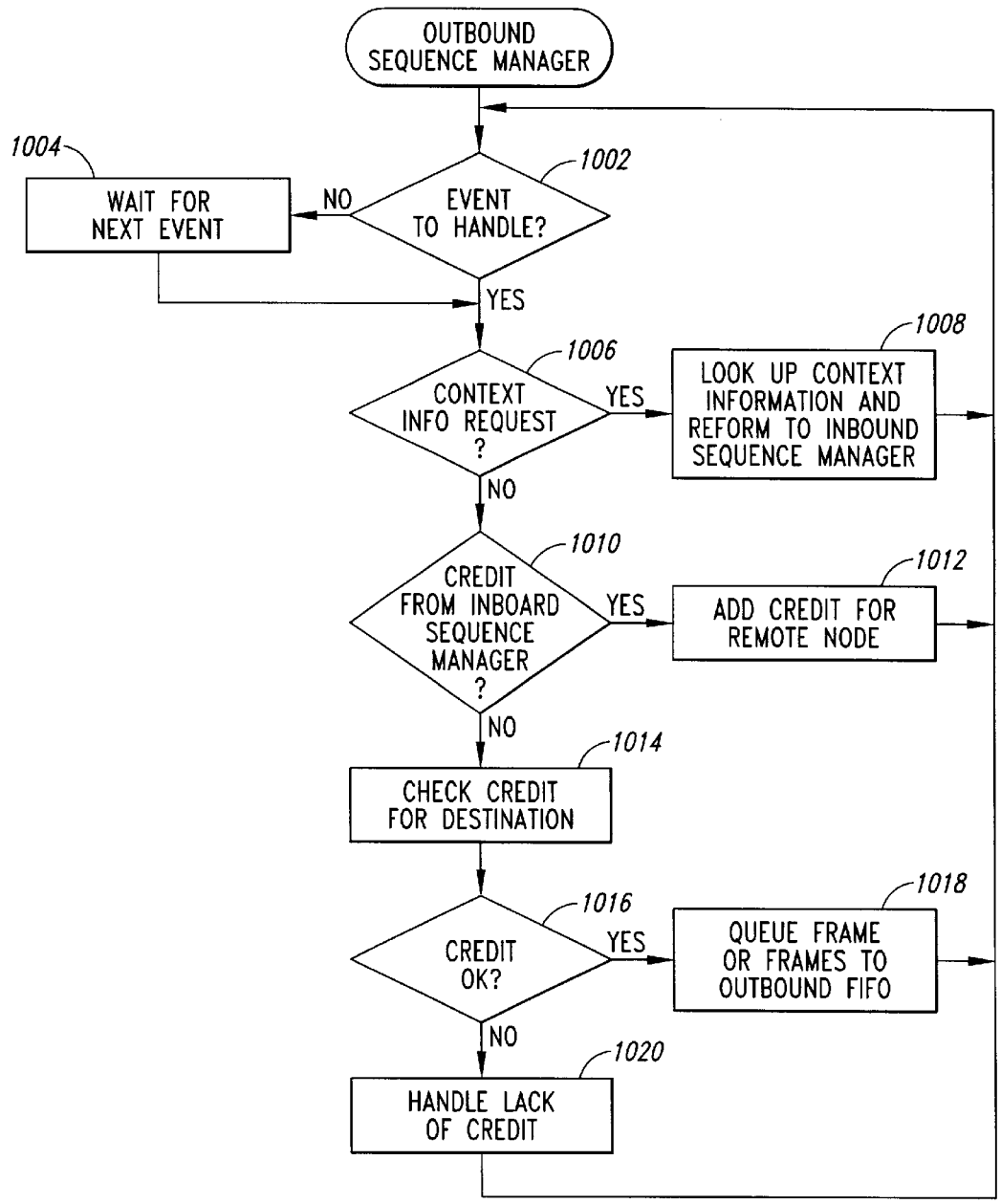
FIG. 10 is a flow control diagram for the outbound sequence manager.

FIG. 10 is a flow-control diagram for the outbound sequence manager. As with FIG. 9, the flow-control diagram of FIG. 10 addresses only those outbound sequence manager tasks and activities that relate to processing of outbound FC data frames and ACK frames. In step 1002, the outbound sequence manager determines whether there is an event to handle. If not, then in step 1004, the outbound sequence manager waits until a next event arises. In step 1006, the outbound sequence manager determines whether the event to be handled is a context information request related to a received ACK frame from the inbound data manager, represented in FIG. 9 in step 912. If so, then the outbound sequence manager, in step 1008, accesses context information for the FC sequence to which the ACK frame belongs and returns the information to the inbound data manager. Otherwise, in step 1010, the outbound sequence manager determines whether the event is a posting of credit from the inbound data manager, represented in FIG. 9 as step 916. If so, then in step 1012, the outbound sequence manager updates internal state information with regard to the remote node which transmitted the ACK frame that resulted in posting of credit by the inbound data manager. Otherwise, for the purposes of the present discussion, the outbound sequence manager assumes that the event to handle is the construction of an FC data frame from data available in host memory for transmission to a remote node. First, in step 1014, the outbound sequence manager checks to see whether or not the FC node has received credit from the remote node to which the FC data frame is to be sent. If the FC node has received sufficient credit, as determined in step 1016, then the outbound sequence manager prepares an FC data frame and queues the prepared FC data frame to the outbound FIFO queue (719 in FIG. 7) in step 1018. Note that the outbound sequence manager constructs main portions of the FC data frame, such as the FC frame header and data payload sections, and the outbound FIFO manager (719 in FIG. 7) and the frame manager (711 in FIG. 7) may generate other portions of the outbound FC frame. If there is not sufficient credit to send the FC data frame, then, in step 1020, the outbound sequence manager handles the lack of credit situation. The outbound sequence manager may time stamp the failed FC frame construction or otherwise note the inability to send the FC data frame, so that, if the credit is not posted within some maximum allowable time, an EE credit timeout is generated. Additional lack of credit error handling and other types of lack of credit handling are also possible.

Present Invention

Figure 11:
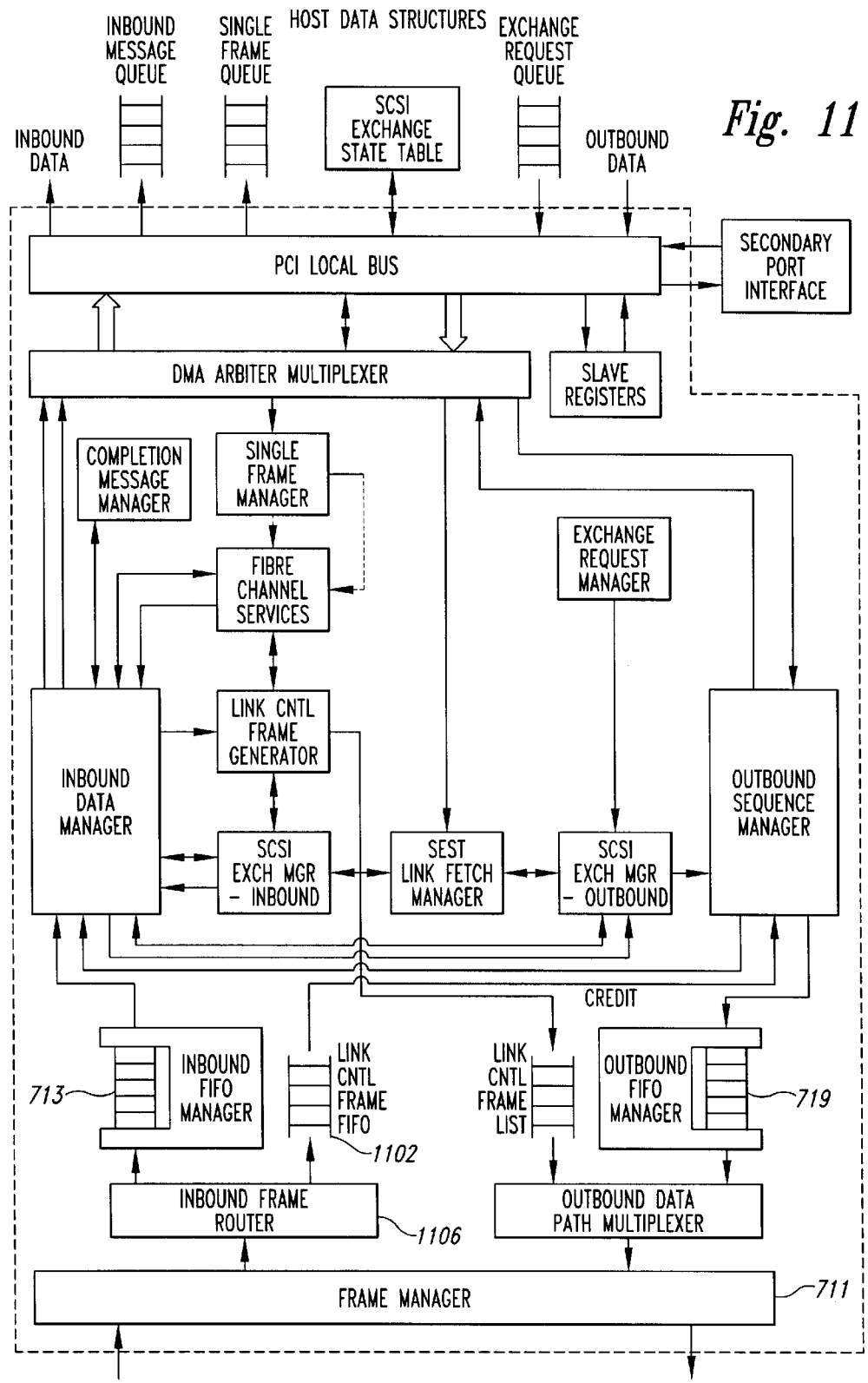
FIG. 11 shows a block diagram of an FC interface controller that represents one embodiment of the present invention.

Because of the problems that may arise from interleaving of FC data frames and ACK frames within FIFO queues, the inventors have recognized that provision of separate FIFO queues for inbound FC frames within an FC controller implementation can separate processing of FC data frames from ACK frames and relieve potential delays and blocking of ACK frame processing. FIG. 11 shows a block diagram of an FC interface controller that represents one embodiment of the present invention. Many of the components of the FC interface controller shown in FIG. 11 are similar to, or identical with, components of the prior art interface controller shown in FIG. 7. These components will not be described again. Instead, those added components that represent one embodiment of the present invention will be described below with reference to FIG. 11. The first notable difference between the FC interface controller of FIG. 11 and the prior art FC interface controller of FIG. 7 is that the FC interface controller that represents one embodiment of the present invention, shown in FIG. 11, includes a separate link-control frame FIFO queue 1102 for inbound FC link-control frames. The inbound FC link-control frame FIFO 1102 can store up to eight FC link-control frames. Because there are now two separate inbound FIFO queues, an additional component referred to as an inbound frame router 1106 is included to route inbound frames to the appropriate inbound FIFO queue. The inbound frame router 1106 parses the high four bits of the R_CTL field of each incoming FC frame to determine whether or not the FC frame is a link-control frame. The inbound frame router 1106 routes FC data frames to the inbound FIFO manager 713 and routes inbound FC link-control frames to the link-control frame FIFO 1102.

Figure 12:
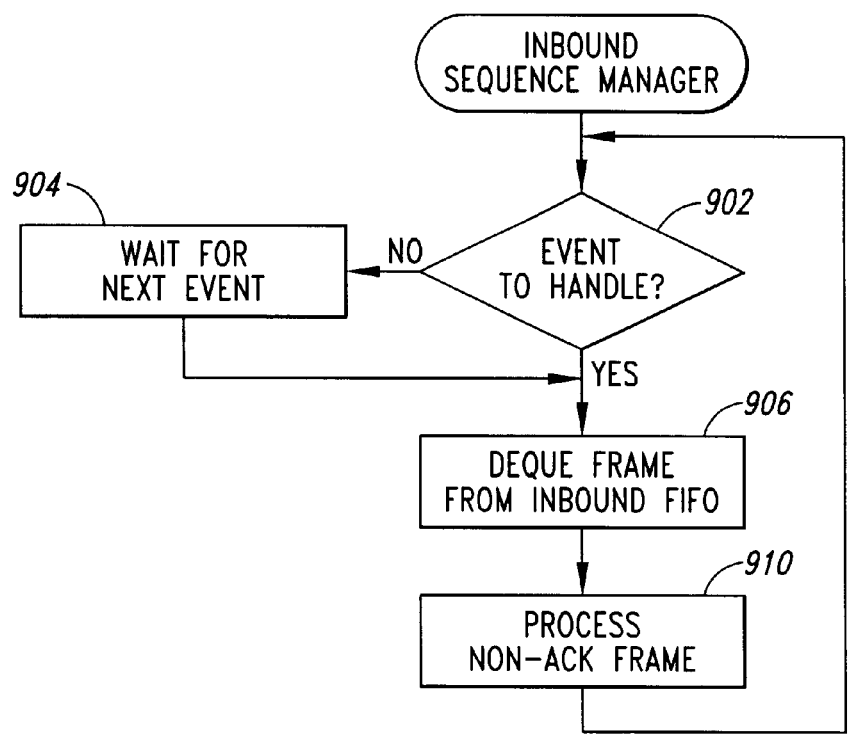
FIG. 12 is a flow control diagram for the inbound data manager in one embodiment of the present invention.
Figure 13:
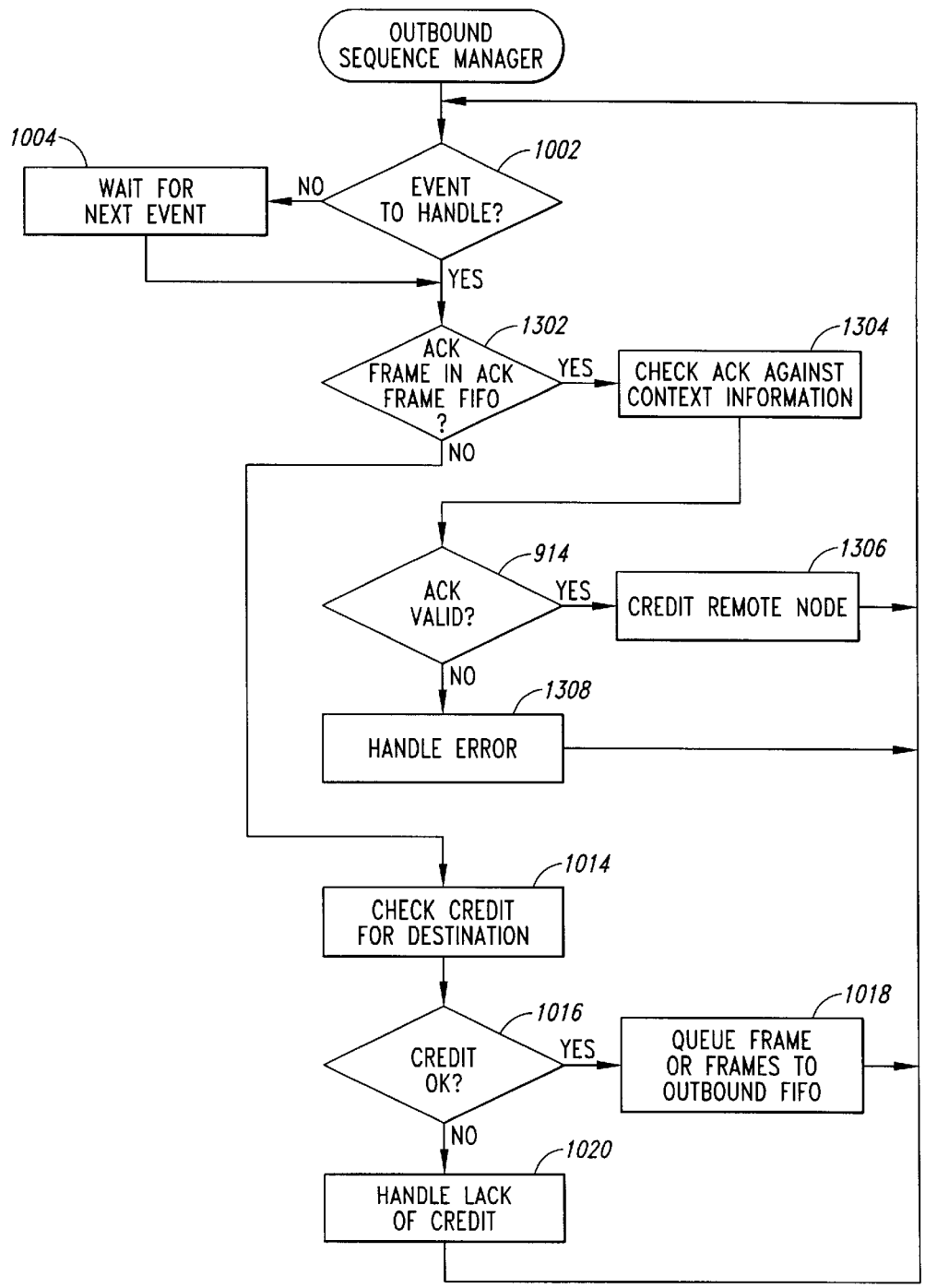
FIG. 13 is a flow control diagram for the outbound sequence manager in one embodiment of the present invention.

FIG. 12 is a flow-control diagram for the inbound data manager in one embodiment of the present invention. FIG. 12 can be contrasted with FIG. 9, showing an equivalent flow-control diagram for the prior art inbound data manager, to immediately reveal the simplification in the inbound data manager under the present invention arising from separate inbound FIFO queues for FC data frames and for FC link-control frames. The steps of the flow-control diagram shown in FIG. 12 are labeled with the same numerical labels used for equivalent steps of the flow-control diagram shown in FIG. 9. Thus, all steps shown in FIG. 12 are equivalent to steps in FIG. 9, and steps 908, 912, 914, 916, and 918 of FIG. 9 have been eliminated from the inbound data manager in the described embodiment of the present invention. Similarly, FIG. 13 is a flow-control diagram for the outbound sequence manager in one embodiment of the present invention. Many of the steps in the flow-control diagram of FIG. 13 are equivalent to steps in the prior art inbound data manager and outbound sequence manager flow-control diagrams of FIGS. 9 and 10, respectively, and are labeled with the same numerical labels as used in FIGS. 9 and 10. Only the steps new to FIG. 13 are described below. In the first new step 1302, the outbound sequence manager checks to see if there is an ACK frame queued to the FC link-control FIFO 1102. If so, then the received ACK frame is checked against context information maintained by the outbound sequence manager for the FC sequence to which the ACK frame belongs in step 1304. If the received ACK frame is valid, as determined in step 914, then a credit is posted internally within the outbound sequence manager for the remote node from which the ACK frame was received, in step 1306. Otherwise, in step 1308, error handling is undertaken. Thus, the outbound sequence manager under the present invention handles processing of incoming ACK frames that, in prior art implementations, are handled by both the inbound data manager and outbound sequence manager. If an ACK frame is not available in the FC link-control FIFO 1102, then the event is assumed to comprise the availability of data within host memory from which an FC data frame can be constructed and transmitted to a remote node. Steps for processing the available data, including steps 1014, 1016, 1018, and 1020, are the same for the outbound sequence manager of the present invention as the steps for processing the available data in prior art FC interface controllers, as shown in FIG. 10.

By employing separate FIFOs for FC data frames and ACK frames, the above-described problems related to interleaving of FC data frames and ACK frames within a single FIFO queue are prevented. Thus, posting of credits in response to reception of ACK frames is not delayed by processing of previously received FC data frames, but are is carried out directly by the outbound sequence manager. Latency in converting received ACK frames into credits is markedly decreased. Moreover, in the FC interface controller of FIG. 11, outbound FC data frame transmission no longer depends on inbound FC data frame processing. In turn, inter-frame gaps on the FC link are decreased, there is a decreased likelihood of EE timeouts resulting from delayed or blocked processing of ACK frames, the bandwidth availability of the FC link is increased, I/O latency is decreased, and the number of loop arbitrations required per I/O in FC arbitrated loop topologies is a decreased.

The present invention concerns separate queuing of FC data frames and ACK frames. The FC link-control FIFO queue and FC link-control lists (1102 and 1104 in FIG. 11, respectively) may additionally contain other types of link-control frames, such as link_response frames and link_command frames. Processing of these other types of link-control frames comprises queuing them to the SFQ to allow the host to process them.

Although the present invention has been described in terms of a particular embodiment, it is not intended that the invention be limited to this embodiment. Modifications within the spirit of the invention will be apparent to those skilled in the art. For example, the functionalities described in flow-control diagrams shown in FIGS. 12 and 13 may be implemented in an almost limitless number of different logic circuits, firmware, or logic circuit and firmware combinations. Similarly, FIFO queues may be implemented in many different logic-circuit and low-level-component implementations within an FC interface controller. Different strategies can be employed for ordering the processing of link-control frames and FC data frames, in general expediting processing of link-control frames, but guaranteeing processing of FC data frames within reasonable time intervals. Many different types of internal data storage and logic circuit implementations may be employed for maintaining current information with respect to remote nodes and FC sequences, to allow for validation of received ACK frames and for control of transmission of FC data frames. In the above-described implementation, inbound data manager and outbound sequence manager tasks related to processing of ACK frames and FC data frames are shown as iterative loops, but separate logic circuits may be directly invoked via internal signal paths to handle these tasks, or separate firmware routines may be invoked by internal interrupts or other invocation mechanisms. Buffers other than FIFO queues may employed for buffering inbound and outbound FC data frames and FC link-control frames.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It Is intended that the scope of the invention be defined by the following claims and their equivalents.

What is claimed is:

1. A method for processing inbound data frames and acknowledgement frames within a fibre channel interface controller, the method comprising:
   providing an inbound data frames buffer within the fibre channel interface controller for buffering all incoming data frames and an inbound acknowledgement frame buffer within the fibre channel interface controller for buffering all incoming acknowledgement frames;
   directing all incoming data frames from a fibre channel link to only the inbound data frame buffer and directing all incoming acknowledgement frames from the fibre channel link to only the inbound acknowledgement frame buffer, such that the inbound data frame buffer does not buffer incoming acknowledgement frames and the inbound acknowledgement frame buffer does not buffer incoming data frames;
   processing inbound acknowledgement frames by from the inbound acknowledgement frame buffer to verify the inbound acknowledgement frames and to transform verified acknowledgement frames into credits associated with remote nodes that transmitted the acknowledgement frames; and
   processing inbound data frames buffered in the inbound data frame buffer.

2. The method of claim 1 wherein the inbound data frame buffer and the inbound acknowledgement frame buffer are both first-in-first-out queues, wherein data frames are queued to the inbound data frame first-in-first-out queue in their order of arrival from the fibre channel link and acknowledgement frames are queued to the inbound acknowledgement frame first-in-first-out queue in their order of arrival from the fibre channel link, wherein the least recently queued data frame is dequeued from the inbound data frame first-in-first-out queue prior to processing the date frame, and wherein the least recently queued acknowledgement frames is dequeued from the inbound acknowledgement frame first-in-first-out queue prior to processing the acknowledgement frame.

3. The method of claim 1 wherein inbound acknowledgement frames buffered in the inbound acknowledgement frame buffer are processed by an outbound sequence manager component that creates data frames from buffered data and places the data frames into an outbound buffer for transmission to the fibre channel link.

4. The method of claim 1 wherein outbound acknowledgement frames are prepared from inbound data frame headers and transmitted to the fibre channel link.

5. The method of claim 1 wherein processing an inbound data frame buffered in the inbound data frame buffer includes:
   moving data from the inbound data frame to memory; and
   updating state information for a fibre channel sequence that includes the data frame.

6. The method of claim 1 wherein processing an inbound data frame buffered in the inbound data frame buffer includes initiating generation of an acknowledgement frame to return to the node that sent the data frame to acknowledge receipt of the data frame and to transmit credits to the node that sent the data frame.

7. The method of claim 1 wherein acknowledgement frames include ACK_0 and ACK_1 acknowledgement frames.

8. The method of claim 1 wherein acknowledgement frames includes ACK_N acknowledgement frames.

9. The method of claim 1 wherein an inbound data manager component processes inbound data frames buffered in the inbound data frame buffer.

10. The method of claim 1 wherein an inbound frame router directs incoming data frames from the fibre channel link to the inbound data frame buffer and directs incoming acknowledgement frames from the fibre channel link to the inbound acknowledgement frame buffer.

11. A fibre channel interface controller that includes:
    an inbound data frame buffer configured to buffer all incoming data frames;
    an inbound acknowledgement frame buffer configured to buffer all incoming acknowledgement frames;
    an outbound frame buffer;
    an inbound frame router that directs all inbound data frames to only the inbound data frame buffer and routes all inbound acknowledgement frames to only the inbound acknowledgement frame buffer;
    an inbound data manager component that processes inbound data frames stored in the inbound data frame buffer; and
    outbound sequence manager component that processes acknowledgement frames stored in the inbound acknowledgement frame buffer and that creates data frames for transmission to remote nodes and stores the created data frames in the outbound frame buffer.

12. The fibre channel controller of claim 11 wherein the outbound sequence manager component processes inbound acknowledgement frames buffered in the inbound acknowledgement frame buffer to verify the inbound acknowledgement frames and to transform verified acknowledgement frames into credits associated with remote nodes that transmitted the acknowledgement frames.

13. The fibre channel controller of claim 11 wherein the inbound data frame buffer and the inbound acknowledgement frame buffer are both first-in-first-out queues, wherein data frames are queued to the inbound data frame first-in-first-out queue in their order of arrival from the fibre channel link and acknowledgement frames are queued to the inbound acknowledgement frame first-in-first-out queue in their order of arrival from the fibre channel link, wherein the least recently queued data frame is dequeued by the inbound data manager component from the inbound data frame first-in-first out queue prior to processing the data frame, and wherein the least recently queued acknowledgement frame is dequeued from the inbound acknowledgement frame first-in-first-out queue prior to processing the acknowledgement frame.

14. The fibre channel controller of claim 11 wherein outbound acknowledgement frames are prepared from inbound data frame headers and transmitted to the fibre channel link.

15. The fibre channel controller of claim 11 wherein the inbound data manager component processes an inbound data frame buffered in the inbound data frame buffer by:

moving data from the inbound data frame to memory; and updating state information for a fibre channel sequence that includes the date frame.

16. The fibre channel controller of claim 15 wherein processing an inbound data frame buffered in the inbound data frame buffer further includes initiating generation of an acknowledgement frame to return to the node that sent the data frame to acknowledge receipt of the data frame and to transmit credits to the node that sent the data frame.

17. The fibre channel controller of claim 11 wherein acknowledgement frames include ACK_0 and ACK_1 acknowledgement frames.

18. The fibre channel controller of claim 11 wherein acknowledgement frames include ACK_N acknowledgement frames.

19. The fibre channel controller of claim 11 wherein the inbound frame router directs the inbound data and acknowledgement frames such that the inbound data frame buffer does not buffer inbound acknowledgement frames and the inbound acknowledgement buffer does not buffer inbound data frames.

20. The fibre channel controller of claim 11 wherein the outbound sequence manager component processes inbound acknowledgement frames exclusively from the inbound acknowledgement frame buffer.

21. A method for processing inbound data frames and acknowledgement frames within a fibre channel interface controller, the method comprising:

providing an inbound data frames buffer within the fibre channel interface controller for buffering all incoming data frames and an inbound acknowledgement frame buffer within the fibre channel interface controller for buffering all incoming acknowledgement frames;

directing all incoming data frames from a fibre channel link to only the inbound data frame buffer and directing all incoming acknowledgement frames from the fibre channel link to only the inbound acknowledgement frame buffer;

processing inbound data frames buffered in the inbound data frame buffer; and processing inbound acknowledgement frames exclusively from the inbound acknowledgement frame buffer, wherein the processing includes:

verifying the inbound acknowledgement frames;

transforming the verified acknowledgement frames into credits associated with remote nodes that transmitted the acknowledgement frames; and creating data frames from buffered data and placing the data frames into an outbound buffer for transmission to the remote nodes through the fibre channel link, wherein the transmission of the data frames is based on the credits associated with the remote nodes.

* * * * *